United States Patent [19]

Haze et al.

[11] Patent Number: 4,661,917

[45] Date of Patent: Apr. 28, 1987

[54] MIXING COMBINATORIAL COUNTING AND WEIGHING METHOD, AND APPARATUS THEREFOR

[75] Inventors: Setsuo Haze, Shiga; Yugo Fujitani, Ohtsu, both of Japan

[73] Assignee: Kabushiki Kaisha Ishida Koki Seisakusho, Kyoto, Japan

[21] Appl. No.: 553,074

[22] Filed: Nov. 18, 1983

[30] Foreign Application Priority Data

Nov. 18, 1982 [JP] Japan .................................. 57-203480

[51] Int. Cl.⁴ ...................... G01G 13/02; G06F 15/46
[52] U.S. Cl. ...................................... 364/567; 177/25
[58] Field of Search .................. 364/567, 555, 478; 177/1, 25, 26, 55, 56, 70

[56] References Cited

U.S. PATENT DOCUMENTS

| | | | |
|---|---|---|---|
| 3,708,027 | 1/1973 | Hill | 177/70 X |
| 3,714,401 | 1/1973 | Yano | 364/478 |
| 4,385,670 | 5/1983 | Braun et al. | 177/1 |
| 4,397,364 | 8/1983 | Hirano | 177/25 |
| 4,419,734 | 12/1983 | Wolfson et al. | 364/567 |
| 4,522,274 | 6/1985 | Konishi et al. | 171/25 |
| 4,549,617 | 10/1985 | Matsumoto et al. | 171/1 |

FOREIGN PATENT DOCUMENTS 0079237  5/1983  European Pat. Off. .
2067862  7/1981  United Kingdom .

OTHER PUBLICATIONS

Instruments & Control Systems, "Interfacing Electronic Scales with a Central Computer", by L. A. Tonies, vol. 50, No. 6, Jun. 1977, pp. 49-51.

Primary Examiner—Felix D. Gruber
Assistant Examiner—Thomas G. Black
Attorney, Agent, or Firm—Staas & Halsey

[57] ABSTRACT

A mixing combinatorial counting and weighing method and apparatus for packaging a wide variety of articles in a single pack, wherein the numbers or ratio of the candies are designated. Prescribed numbers of the articles, which are high in unit price or large in volume, are discharged by using article supply units and combinatorial counting units. The weight of the articles discharged is stored, and this stored weight is subtracted from a weight set for the pack to compute the difference. Then, inexpensive articles are discharged using a combinatorial weighing unit, wherein the weight of the articles discharged is equivalent to the computed difference, and the articles discharged from the respective units are collected. Thus, a wide variety of articles can be introduced into a single pack at a prescribed ratio and, at the same time, the total weight of the pack can be held within established limits.

4 Claims, 14 Drawing Figures

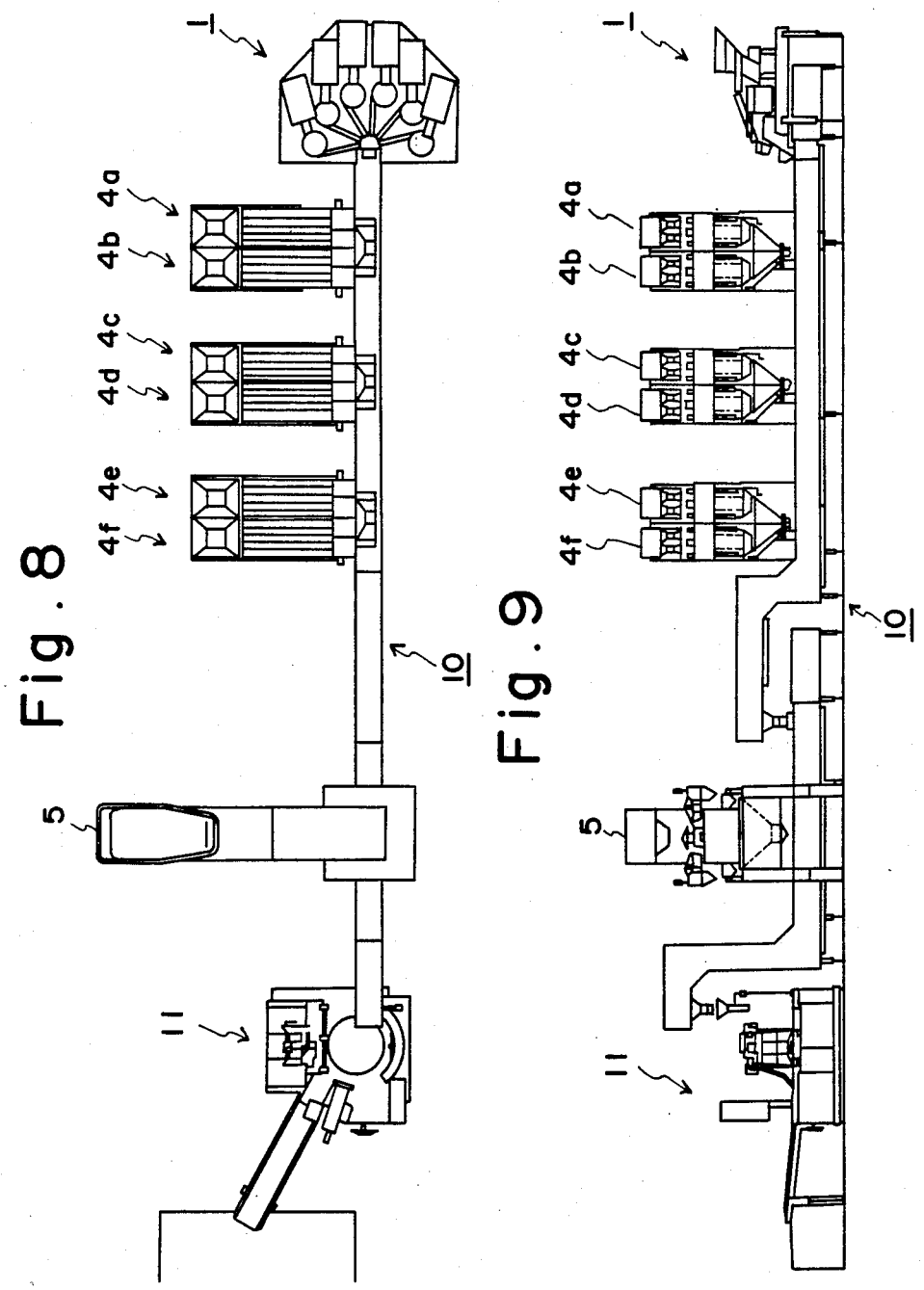

Fig. 11
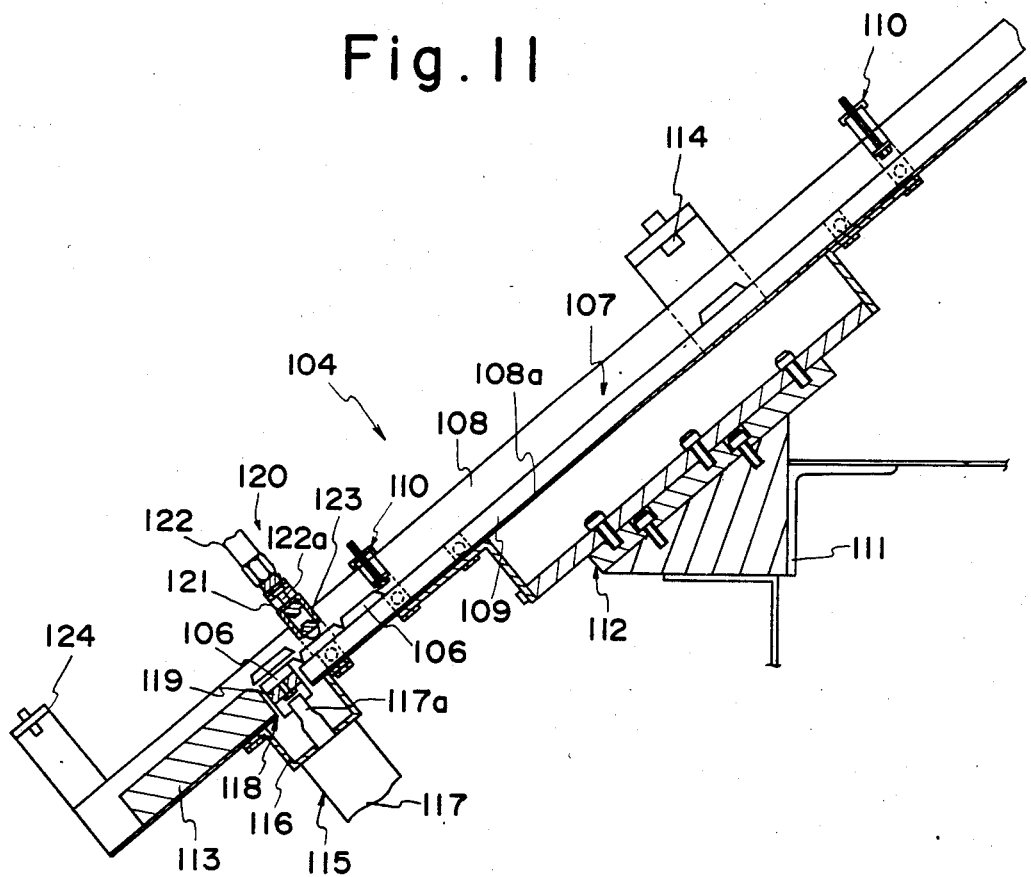
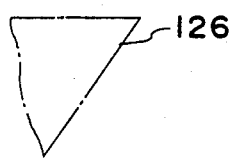

MIXING COMBINATORIAL COUNTING AND WEIGHING METHOD, AND APPARATUS THEREFOR

CROSS-REFERENCE TO RELATED APPLICATIONS

This application is related to U.S. application Ser. No. 402,364 filed July 27, 1982, now U.S. Pat. No. 4,549,617, and U.S. application Ser. No. 439,595 filed Nov. 5, 1982, now U.S. Pat. No. 4,522,274.

BACKGROUND OF THE INVENTION

This invention relates to a method and apparatus for mixing and combinatorially counting and weighing articles of a plurality of kinds. More particularly, the invention relates to a fully automated system for packaging a wide variety of, e.g., sweets such as chocolates and candies in a single pack, wherein a set number of the articles which are high in unit price or large in volume are introduced into the pack, and wherein the weight of the pack is held within set limits.

Conventionally, in the above-described mixing and weighing operation involving a large variety of goods, introducing a designated number of high-priced articles into the mixture is, in most cases, an activity performed by hand. Accordingly, there is strong demand for automation of the mixing and weighing operation when dealing with goods of which there is a large variety. This derives from the recent high cost of labor and from the fact that manual operations are inefficient, troublesome and tend to diminish the accuracy of weighing and counting operations. An automated system for mixing, counting and weighing a wide variety of articles would raise both the efficiency and accuracy of these operations.

SUMMARY OF THE INVENTION

An object of the present invention is to provide a system in which the mixing and combinatorial counting and weighing of a large variety of articles are performed automatically, accurately and at high speed, wherein the number or weight of the articles introduced into a mixture from each article category can be specified, while the total weight of the mixture is held within specified limits.

According to the present invention, the foregoing object is attained by weighing out designated varieties of articles a predetermined number at a time, weighing out and counting articles of a designated variety different from the above-mentioned designated varieties, storing the weights obtained in the foregoing steps, adding the stored weights, computing the difference between the sum of the added weights and a weight set for a single pack, and performing combinatorial weighing with the computed difference serving as a target value.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIGS. 8 and 9 are a plan view and side view, respectively, showing a specific arrangement of the units constituting the system of the invention;

FIG. 11 is a sectional view of an article supply unit;

DESCRIPTION OF THE PREFERRED EMBODIMENT

In the detailed description of the illustrated embodiment which follows, we will assume that six varieties of sweets that are high in unit price or large in volume are to be introduced into a single pack, with one or plural sweets of each variety being included. Further, besides the foregoing sweets, another six varieties of sweets shall be introduced into the pack, the number of sweets of each kind being predetermined. Finally, in addition to the sweets mentioned so far, a single variety which is low in price shall be introduced into the pack.

More specifically, according to the present invention as embodied herein, a wide variety of sweets, referred to as "candy" hereinafter, are introduced into a single pack at the above-described ratio. In operation, six varieties of candy, such as candy which is high in unit price or large in volume, are discharged into a weighing hopper from article supply units. One or plural pieces of the candy of each kind are discharged. The weight of this discharged batch of candy is measured and stored in a register, and the batch is introduced into a single bucket of a bucket conveyor. Next, by using six combinatorial counting units, a designated number of pieces of candy in each of six varieties different from the foregoing is sequentially discharged into the aforesaid bucket. The weight of each newly discharged batch is added to the weight of the batches discharged previously. Eventually, a sum representing the total weight of the 12 kinds of candy discharged is stored in a register. This is followed by subtracting the total discharge weight from a target weight set for the pack, thereby to compute the weight of candy which must be added to the mixture to arrive at the weight set for the pack. The value obtained is delivered to a combinatorial weighing unit where the value serves as a target for a combinatorial computation. The combinatorial weighing unit then proceeds to combinatorially weigh out a single variety of candy which is comparatively inexpensive. This is achieved by obtaining a combination of weighing machines giving a total weight value equal to the target weight value or closest to the target weight value within preset allowable limits, and by discharging the candy from the selected combination of weighing machines into the aforesaid bucket. Through these operations, a fixed number of pieces of candy, the kinds of which are predetermined, are introduced into a single pack, the total weight of which is held constant.

Figure 1:
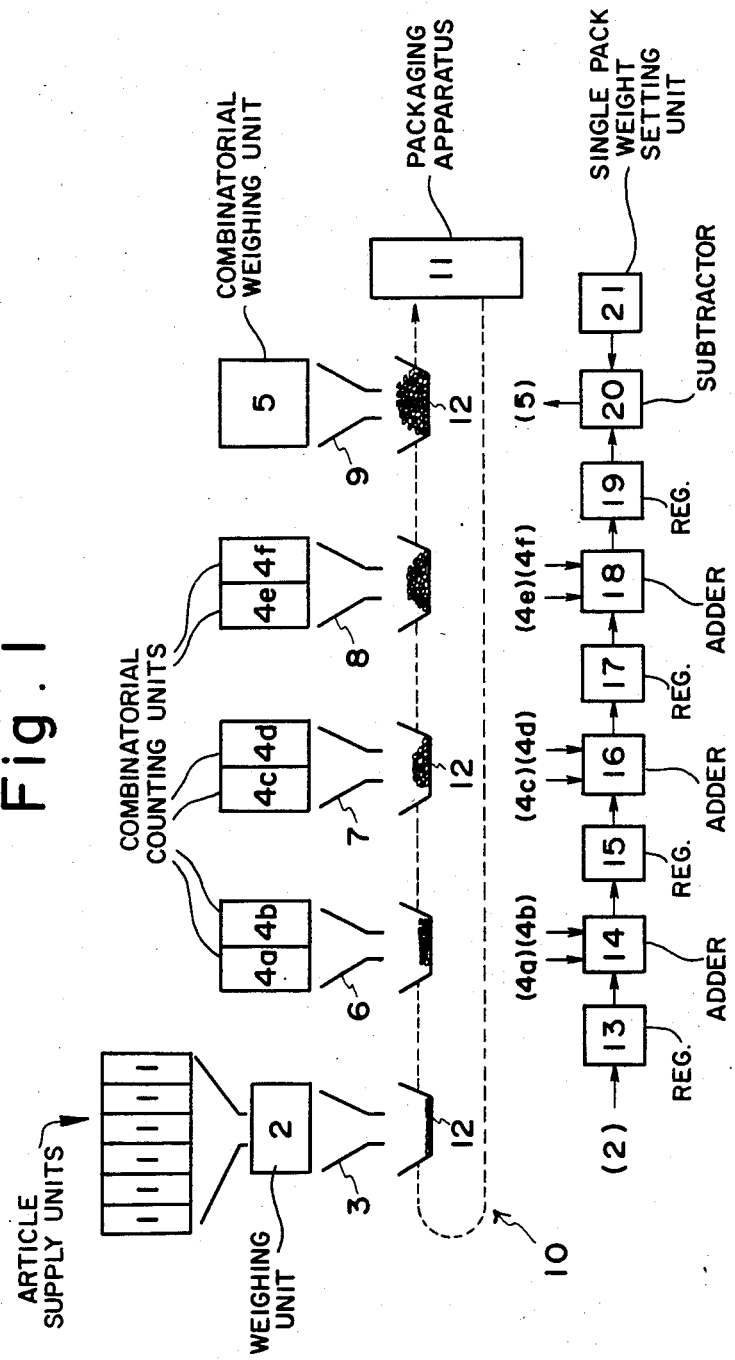
FIG. 1 is a schematic view of the overall arrangement of a system according to the present invention and is useful in describing the operation of the invention.

Reference will now be had to FIG. 1 to describe the operation of each of the units for performing the foregoing counting and weighing activities.

In the illustrated embodiment, the system includes six article supply units 1 each of which supplies one piece of a different variety of candy at a time. Though each article supply unit 1 is adapted to discharge one piece of candy each operating cycle, if it is desired to designate a plurality of candies of a specific kind, the corresponding article supply unit is operated a plurality of cycles. The candies dealt with in these article supply units are those which are, for example, high in unit price or large in volume. A simple weighing unit 2 is disposed below the six article supply units 1 for measuring the total weight of the six variety of candy discharged from the article supply units, the number of pieces of candy being six or more. A first collecting chute 3 is disposed below the weighing unit 2, though an arrangement may be adopted in which the first chute is deleted and the candy is introduced directly into a bucket, described below, from the weighing hopper of the weighing unit 2.

Numerals 4a through 4f denote combinatorial counting units, each of which discharges only a predetermined number of pieces of candy into collecting chutes, described below. These candies are of varieties different from one other and different from those supplied by the article supply units 1. Thus, the combinatorial counting units 4a through 4f, which are arranged in three sets of two units each, are capable of discharging six varieties of candy. Each of the combinatorial counting units 4a through 4f has five weighing machines, and each weighing machine is composed of a weighing hopper and a weight sensor accompanying the weighing hopper. Each combinatorial counting unit operates by weighing the candy supplied to each of the five weighing machines, dividing each weight value by a mean unit weight entered beforehand, calculating the number of pieces of candy in each weighing machine, computing combinations based on the numbers of pieces in each of the five weighing machines, finding one combination giving a value equivalent to a preset target number, and discharging into the collecting chute the candy in the weighing hoppers of the weighing machines corresponding to the combination found.

A combinatorial weighing unit 5 is provided for discharging a single variety of comparatively inexpensive candy, the amount of candy discharged being of a prescribed weight. Using a target value obtained by subtracting the total weight of the candies discharged from the six article supply units 1 and the six combinatorial counting units 4a through 4f, from a weight which is set for one pack of the candy mixture, the combinatorial weighing unit 5 performs a combinatorial weighing operation to find a combination of weight values the total of which is equal to the target value or closest to the target value within preset limits. The candy in the weighing hoppers of the weighing machines corresponding to the found combination is discharged from the weighing unit 5.

Second, third and fourth collecting chutes 6, 7 and 8 are disposed below the three sets of combinatorial counting units composed of units 4a, 4b; 4c, 4d; and 4e, 4f; respectively. Each of the collecting chutes 6, 7, 8 is adapted to collect the candies discharged from the corresponding set of two combinatorial counting units. A fifth collecting chute 9 is disposed below the combinatorial weighing unit 5. It should be noted that each of the aforementioned collecting chutes constitutes a component part of the respective counting or weighing unit.

A bucket conveyor 10 has a plurality of buckets 12 attached thereto. The buckets 12 are conveyed in such a manner that candies discharged from each of the collecting chutes 3, 6, 7, 8, 9 are sequentially received in the same bucket, which is then delivered to a packaging apparatus 11.

A first register 13 stores the weight of the candy batch, composed of six or more pieces, obtained from the weighing unit 2. A first adder 14 adds the value stored in the first register 13 to the weight of the batch of candies discharged from the combinatorial counting units 4a, 4b. A second register 15 stores the output of the first adder 14. A second adder 16 adds the value stored in the second register 15 to the weight of the batch of candies discharged from the combinatorial counting units 4c, 4d. A third register 17 stores the output of the second adder 16. A third adder 18 adds the value stored in the third register 17 to the weight of the batch of candies discharged from the combinatorial counting units 4e, 4f. A fourth register 19 stores the output of the third adder 18. A subtractor 20 subtracts the value stored in the fourth register 19 from a weight set for a single pack of the candy mixture by a setting unit 21, thereby computing a weight serving as a target for a combinatorial weighing operation. This value is delivered to the combinatorial weighing unit 5.

The operation of the foregoing equipment is started and stopped by a control unit 22 (FIG. 2) constituted by a microcomputer or the like. The connections of the equipment shown in FIG. 1 and the control unit 22 is as illustrated in the block diagram of FIG. 2.

Figure 2:
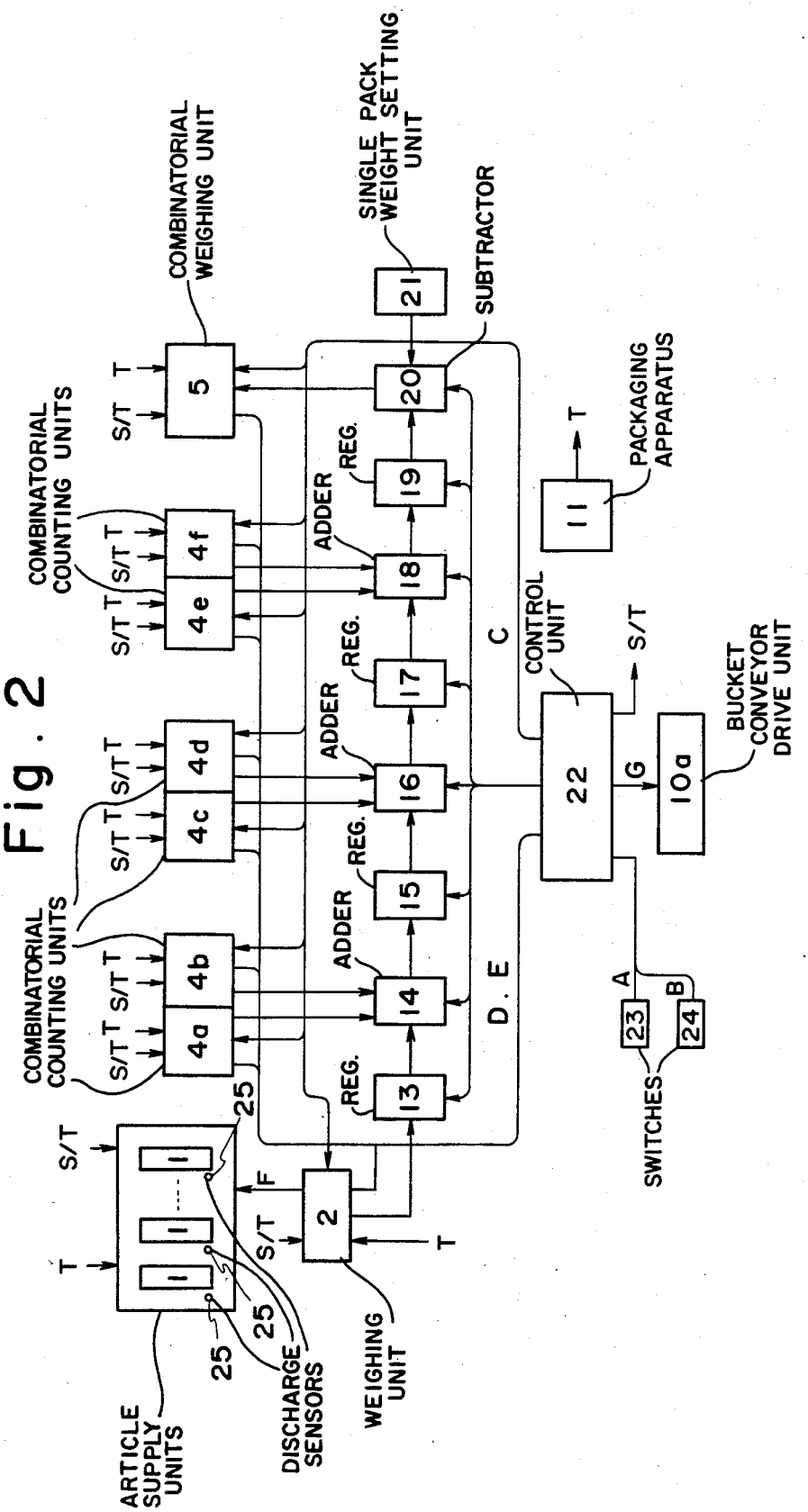
FIG. 2 is a block diagram of the connections of a control unit and the various units constituting the system of FIG. 1.

In FIG. 2, numeral 10a denotes a bucket conveyor drive unit for driving the bucket conveyor 10. Start and stop switches 23, 24 deliver start and stop signals A, B, respectively to the control unit 22. These switches 23, 24 are used when starting and stopping the activity for, say, a single day. Reference character T represents a timing signal produced by the packaging unit 11, and S/T a start/stop signal produced by the control unit 22. When the start signal A is applied to the control unit 22, the control unit delivers the start/stop signal S/T sequentially to the article supply units 1, weighing unit 2, the set of combinatorial counting units 4a, 4b, the set of combinatorial counting units 4c, 4d, the set of combinatorial counting units 4e, 4f, and the combinatorial weighing unit 5, whereby each unit or set of units is enabled in sequential fashion. When the stop signal B is applied to the control unit 22, the delivery of the start/stop signal S/T to the foregoing units is sequentially terminated to automatically stop the operation of each unit after the candy is discharged from them. Reference character C denotes a discharge enable signal produced by the control unit 22. Reference characters D, E denote proper and improper quantity signals, respectively, which the control unit 22 receives as inputs from the weighing unit 2 connected to the article supply units 1, the combinatorial counting units 4a through 4f, and the combinatorial weighing unit 5.

Figure 3:
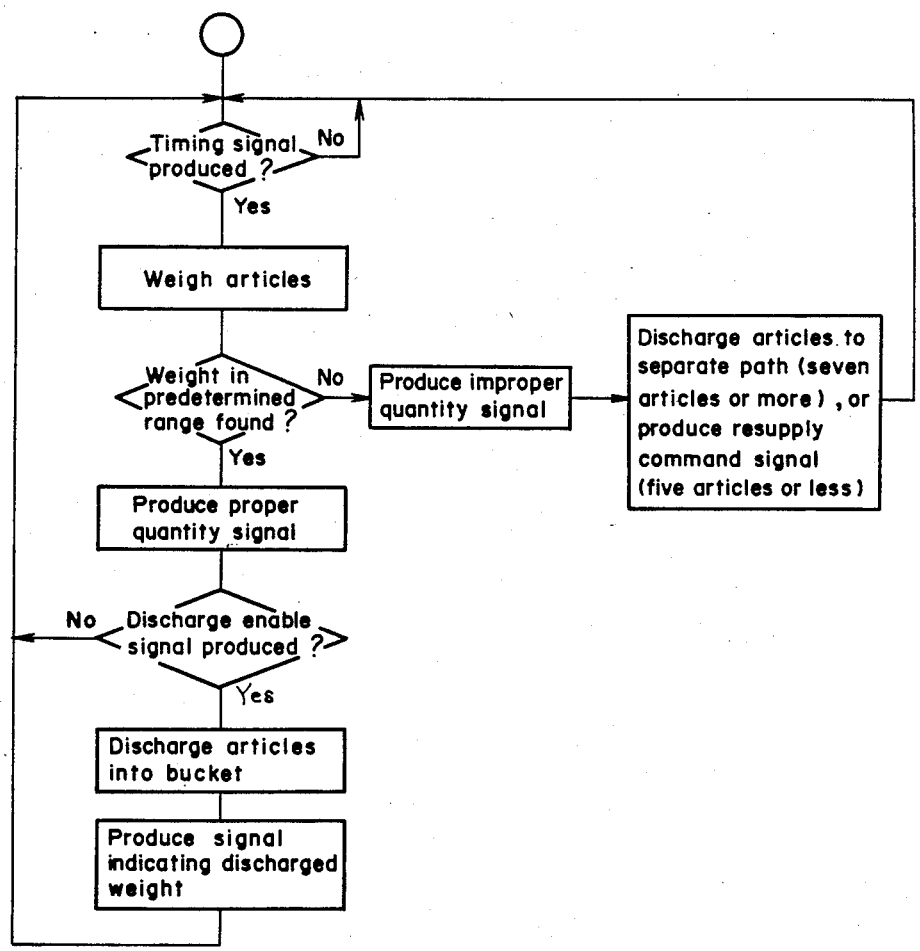
FIG. 3 is a flowchart for the operation of a weighing unit.
Figure 4:
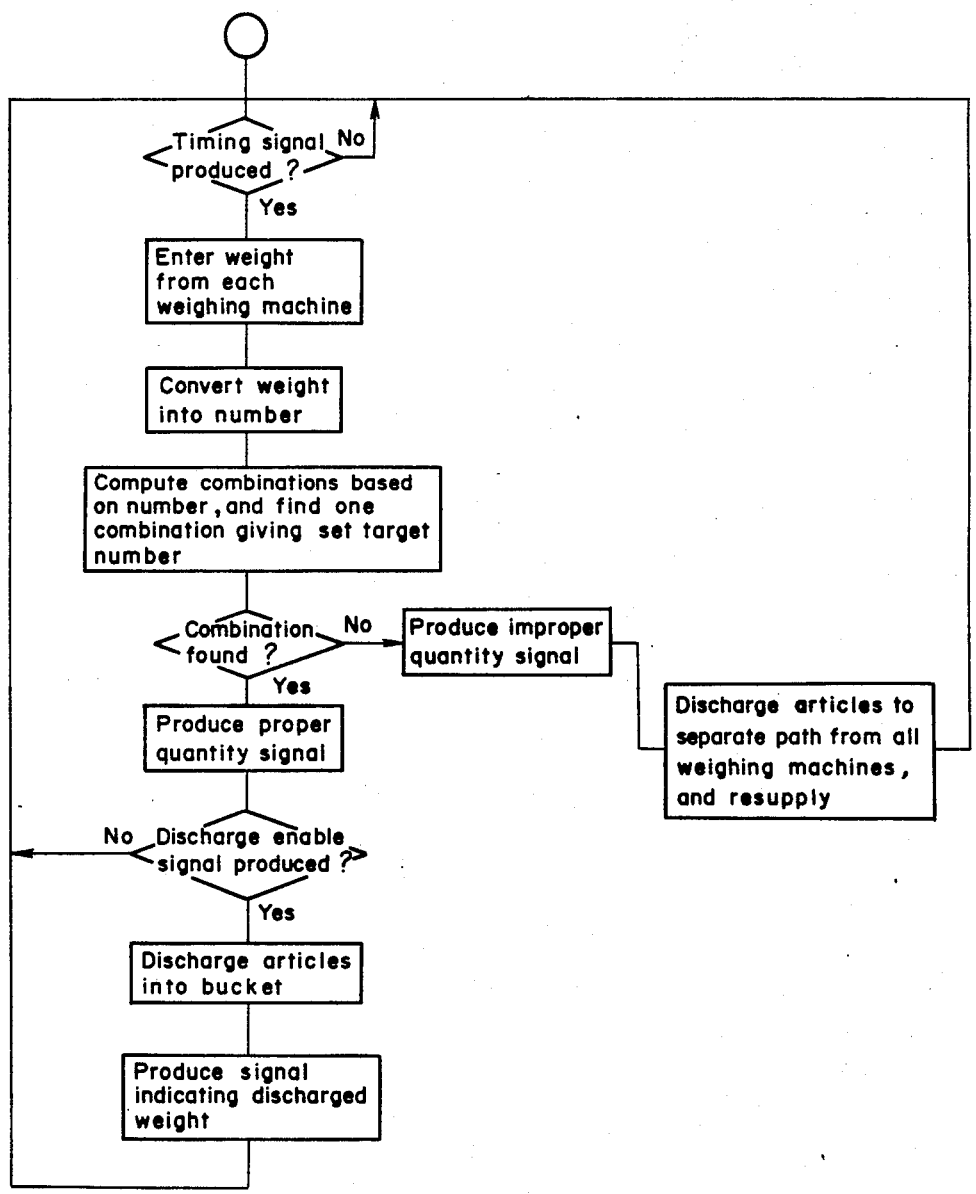
FIG. 4 is a flowchart for the operation of a combinatorial counting unit.
Figure 5:
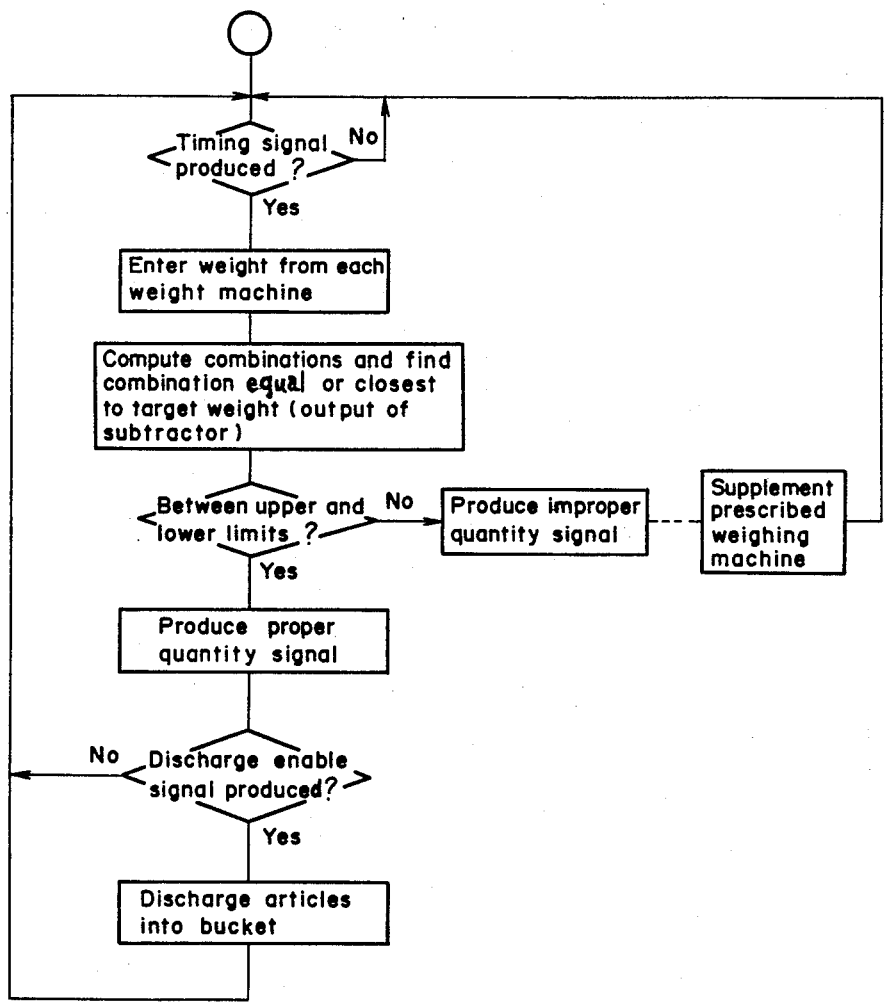
FIG. 5 is a flowchart for the operation of a combinatorial weighing unit.

Reference will now be had to the flowcharts of FIGS. 3 through 5 to describe the operation of the article supply units 1, combinatorial counting units 4a through 4f and combinatorial weighing unit 5 when weighing and counting activities are carried out.

First, the packaging unit 11 applies the timing signal T to the article supply units 1 and weighing unit 2, whereupon the article supply units 1 begin operating, and the weighing unit 2 operates in the manner shown in the flowchart of FIG. 3. More specifically, applying the timing signal T to the article supply units 1 causes these units to discharge a total of six pieces of candy, each of a different kind, into the weighing unit 2, which then proceeds to measure the weight of the batch consisting of the six pieces of candy. If the weight value obtained falls within allowable limits of a set batch weight value obtained by totaling the unit weights of the six pieces of candy, the weighing unit 2 applies the proper quantity signal D to the control unit 22; if not, then the weighing unit 2 sends the improper quantity signal E to the control unit 22. When, in addition to the proper quantity signal D from the weighing unit 2, the control unit 22 receives the proper quantity signals D from the other operating units, namely the combinatorial counting units 4a through 4f and the combinatorial weighing unit 5, the control unit 22 delivers the discharge enable signal C to the weighing unit 2. The latter responds by discharging the weighed batch of six pieces of candy into a certain one of the buckets 12, and by applying the weight value to the first register 13. This ends the first weighing operation.

If the weight value measured by the weighing unit 2 is greater than the upper limit of the set weight range, that is, if seven or more pieces of candy are supplied by the article supply units 1, then the weighing unit 2 delivers the improper quantity signal E to the control unit 22, in which case the control unit 22 does not produce the discharge enable signal C. The weighing unit 2 responds by delivering the candies, with which it has been supplied, to a discharge route different from the usual discharge route, by means such as a reject discharge chute. Then, when the packaging unit 11 produces the next timing signal T, the article supply units 1 discharge candies into the weighing unit 2, which proceeds to measure the weight of the batch received.

If the weight value measured by the weighing unit 2 is less than the lower limit of the set weight range, that is, if five or fewer pieces of candy are supplied by the article supply units 1, then the weighing unit 2 does not discharge these candies. When the packaging unit 11 produces the next timing signal T, the weighing unit 2 delivers a resupply command signal F to the supply unit(s) 1 from which candy was not received, whereby only the candy not previously discharged is supplied to the weighing unit 2 from the corresponding article supply unit(s) 1. This will give a total of six pieces of candy of six different varieties. The variety of candy which failed to be discharged as described above is detected by a discharge sensor 25 provided on each article supply unit 1.

Next, reference will be had to FIG. 4 to describe the operation of the combinatorial counting units 4a through 4f when these units receive the timing signal T.

First, the timing signal T is applied to each of the combinatorial counting units 4a through 4f, whereupon the weights of the candies introduced into each of the plural weighing machines constituting each counting unit are measured. In each counting unit, each weight value obtained is then divided by a mean unit weight preset for the particular type of candy, whereby the number of pieces of candy in each weighing machine is obtained. Next, in each combinatorial counting unit 4a through 4f, combinations are computed based on the number of pieces of candy in each weighing machine, whereby a combination of weighing machines giving a total number of pieces of candy equivalent to a target number set for each counting unit is obtained in each counting unit. If a combination giving the set target number is found, the control unit 22 is provided with the proper quantity signal D; if not, then the signal received by the control unit 22 is the improper quantity signal E. When, in addition to the proper quantity signals D from the combinatorial counting units 4a through 4f, the control unit 22 receives the proper quantity signals D from the other operating units, namely the weighing unit 2 and the combinatorial weighing unit 5, the control unit 22 delivers the discharge enable signal C to the combinatorial counting units 4a through 4f. These units discharge the candies that have undergone weighing into the same bucket 12 which received the six pieces of candy received from the article supply units 1 via the weighing unit 2. The prevailing weight values from the combinatorial counting units 4a through 4f are applied to the corresponding adders 14, 16, 18. This ends one operating cycle.

In the event that a combination giving a value equivalent to the set target number cannot be obtained by a combinatorial computation in any of the combinatorial counting units 4a through 4f, in response to which the particular combinatorial counting unit produces the improper quantity signal E, the candy contained in all of the weighing machines belonging to that combinatorial counting unit is delivered to a route, which is different from the usual route, by a reject discharge chute or the like, thereby temporarily emptying all of the weighing machines, irrespective of whether the number obtained is excessive or insufficient. These weighing machines are then resupplied and combinatorial computations are performed again.

The foregoing description relates to a case where each combinatorial counting unit has its own set target number. It should be noted, however, that mere modification of software makes it possible to deal with situations in which there is a requirement that the designated number of pieces supplied to each combinatorial counting unit vary from three to five, and that the total of number of pieces supplied to the combinatorial counting units be 24 (an average of four per unit). More specifically, if the initial combinatorial counting unit 4a has a set target number of from three to five and discharges three pieces of candy, then the next combinatorial counting unit 4b adjusts its target value to four or five. This adjustment of the target value is repeated from one combinatorial counting unit to the next to provide the designated number of 24 pieces of candy by the last combinatorial counting unit 4f.

The operation of the combinatorial weighing unit 5 in response to the timing signal T will now be described with reference to the flowchart of FIG. 5.

First, the timing signal T is applied to the combinatorial weighing unit 5, which responds by weighing the candy which has been supplied to each of a plurality of weighing machines constituting the unit. The combinatorial weighing unit 5 then computes combinations based on the weight values obtained to find one combination giving a total weight equal or closest to a target weight. The target weight is a value obtained by subtracting, from the weight set for one pack of the candy mixture, the total weight of the candies discharged from the article supply units 1 and combinatorial counting units 4a through 4f. This value indicates how much candy must be added to the candy mixture to arrive at the weight set for the pack. If the result of the computation is a combination giving a weight within predetermined limits, the combinatorial weighing unit 5 delivers the proper quantity signal D to the control unit 22. In response to this signal D and the proper quantity signals D from the other operating units, namely the weighing unit 2 and the combinatorial counting units 4a through 4f, the control unit 22 issues the discharge enable signal C. The combinatorial weighing unit 5 responds by discharging the weighed candy into the same bucket 12 which received the candies from the other units. This ends one operating cycle.

If the result of the combinatorial computation is outside the predetermined limits, then the improper quantity signal E is delivered to the control unit 22, and prescribed ones of the weighing machines in the combinatorial weighing unit 5 are supplied with additional pieces of candy to change the statistical dispersion of the weight values. This is followed by recomputing the combinations.

Figure 6:
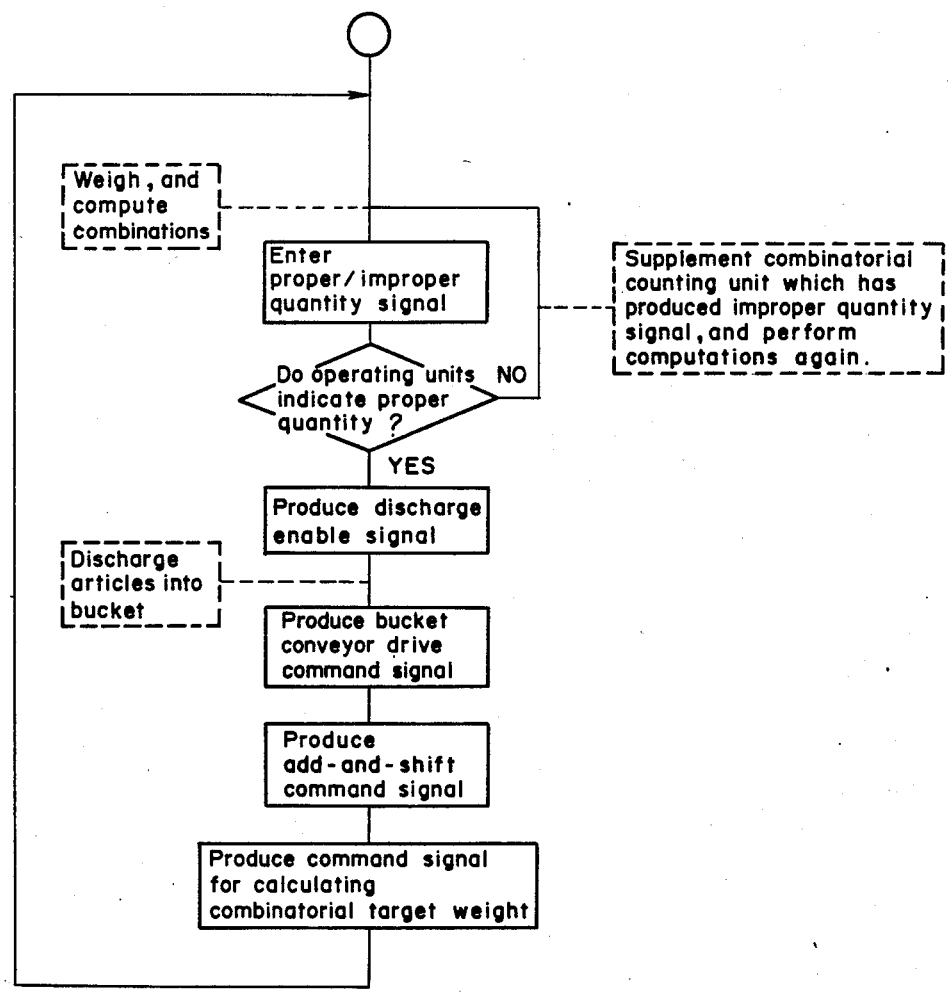
FIG. 6 is a flowchart for the operation of the control unit.

The overall operation of the foregoing equipment, as well as the detailed operation of the control unit 22, will now be described with reference to FIGS. 1, 2 and the flowchart of FIG. 6.

The operator presses the start switch 23 to apply the start signal A to the control unit 22, which responds by delivering the start/stop signal S/T to the article supply units 1 and the weighing unit 2 to enable the supply units 1. When the first timing signal T arrives from the packaging unit 11 under these conditions, the weighing unit 2 receives six pieces of candy, all of different kind, from the article supply units 1, and delivers either the proper quantity signal D or improper quantity signal E to the control unit 22. If the result of the computation performed by the weighing unit 2 is indicative of a proper quantity, the proper quantity signal D is applied to the control unit 22. Since the combinatorial counting units 4a through 4f and combinatorial weighing 5 are not yet operational, the control unit 22 responds solely to the proper quantity signal D from the weighing unit 2 by delivering the discharge enable signal C to the weighing unit 2, whereby the latter discharges the weighed candies into one of the buckets 12 of the bucket conveyor 10 through the first discharge chute 3. When the discharge of candy into the bucket 12 is completed, the control unit 22 produces the bucket conveyor drive command signal G to advance the bucket 12 to the next station and, at the same time, applies an add-and-shift signal to the first register 13, whereby the register stores the weight of the six pieces of candy discharged into the first collecting chute 3.

Next, when the bucket 12 which has received the candies from the first collecting chute 3 arrives, after n cycles, at the point below the second collecting chute 6 associated with the set of combinatorial counting units 4a, 4b, the control unit 22 delivers the start/stop signal S/T to the combinatorial counting units 4a, 4b to enable the same. When the packaging unit 11 again produces the timing signal T under these conditions, the combinatorial counting units 4a, 4b each perform a combinatorial computation and provide the control unit 22 with either the proper quantity signal D or improper quantity signal E. If the result of the computation is indicative of a proper quantity, then the combinatorial counting units 4a, 4b apply the proper quantity signal D to the control unit 22. If the weighing unit 2 operating at this time also applies the proper quantity signal D to the control unit 22, then the control unit 22 again produces the discharge enable signal C. In response, the combinatorial counting units 4a, 4b discharge the predetermined numbers of weighed candies into the bucket 12 through the second collecting chute 6. At this time, in parallel with the weighing and computing operations performed by the combinatorial counting units 4a, 4b, the article supply units 1 and weighing unit 2 also perform weighing and computing operations, so that six pieces of candy to the packaged after n cycles are discharged into a new bucket 12 now situated below the first collecting chute 3.

When the discharge of candies from the combinatorial counting units 4a, 4b into the bucket 12 is completed, the control unit 22 produces the bucket conveyor drive command signal G to advance the bucket 12 to the next station and, at the same time, produces the add-and-shift signal. In consequence, the first adder 14 adds the weight, stored in the first register 13, of the six pieces of candy discharged from the article supply units 1 n cycles earlier, to the weight of the predetermined number of pieces just discharged from the combinatorial counting units 4a, 4b, and stores the resulting sum in the second register 15. After transmitting the foregoing data to the first adder 14, the first register 13 stores the weight of the six pieces of candy just discharged from the weighing unit 2. These pieces of candy will be discharged n cycles later.

Thus, the bucket 12 containing the candies to be used in the first packaging operation eventually receives the candies discharged from the third and fourth collecting chutes 7 and 8 associated with the combinatorial counting units 4c, 4d and 4e, 4f, respectively. The bucket 12 then starts to move toward the point below the fifth collecting chute 9 associated with the combinatorial weighing unit 5 and, at the same time, the control unit 22 issues the add-and-shift signal. When this occurs, the third adder 18 adds the weight of the candies discharged from the weighing unit 2 and combinatorial counting units 4a, 4b, 4c, 4d, (the weight having been stored in the third register 17) to the weight of the candies discharged from the combinatorial counting units 4e, 4f. The resulting sum is delivered to the fourth register 19. When this is accomplished, the control unit 22 provides the subtractor 20 with a signal commanding the subtractor to compute a target value for a combinatorial computation. In response, the subtractor 20 subtracts the total weight of the candies discharged from the weighing unit 2 and combinatorial counting units 4a through 4f, which total weight is stored in the fourth register 19, from the weight set for one pack of the candy mixture. Thus, the subtractor 20 computes a target weight value for a combinatorial computation and delivers the value to the combinatorial weighing unit 5.

Movement of the bucket 12 carrying the candy mixture stops when it arrives at the point below the fifth chute 9 associated with the combinatorial weighing unit 5. At this time the control unit 22 applies the start/stop signal S/T to the combinatorial weighing unit 5 and the packaging unit 11 produces the timing signal. The combinatorial weighing unit 5 therefore discharges candy, the weight of which corresponds to the target weight value, into the bucket 12.

At this time, the bucket 12 situated below the fifth chute 9 associated with the combinatorial weighing unit 5 contains all of the candies to be used in the first packaging operation, and the first through fourth collecting chutes 3, 6, 7, 8 associated with the weighing unit 2 and sets of combinatorial counting units 4a, 4b; 4c, 4d; 4e, 4f;, respectively, have discharged candies to be used in packaging operations from the second packaging operation onward. Thereafter, computation and shift operations begin in the adders 14, 16, 18 and subtractor 20 and, at the same time, the buckets 12 start to move, with the bucket 12 situated below the fifth collecting chute 9 being transferred to the packaging unit 11, where the candy mixture is discharged. The packaging unit 11 now performs the first packaging operation. When this first packaging operation ends and the unit 11 produces the timing signal, the operations described hereinabove are repeated in continuous fashion so that prescribed quantities of the candy mixture are introduced to the packaging unit 11 one after another.

It should be noted that if $n_1$ is the bucket pitch from the weighing unit 2 to the set of combinatorial counting units 4a, 4b, $n_2$ the bucket pitch from the set of combinatorial counting units 4a, 4b to the set of combinatorial counting units 4c, 4d, $n_3$ the bucket pitch from the set of combinatorial counting units 4c, 4d to the set of combinatorial counting units 4e, 4f, and $n_4$ the bucket pitch from the combinatorial counting units 4e, 4f to the combinatorial weighing unit 5, then the first register 13 which stores the weight value from the weighing unit 2, and the second through fourth registers 15, 17, 19 which store the values obtained by summing the weight value from the weighing unit 2 and the preceding weight values from the combinatorial counting units, will store these values sequentially in the order $n_1$, $n_2$, $n_3$, $n_4$, respectively. Also, the contents stored in each register will be shifted sequentially in synchronism with the one pitch transfer of each bucket 12 of the bucket conveyor 10 whenever the timing signal T is produced by the packaging unit 11. Thus, each of the weight values is transferred to the next adder or subtractor.

Figure 7:
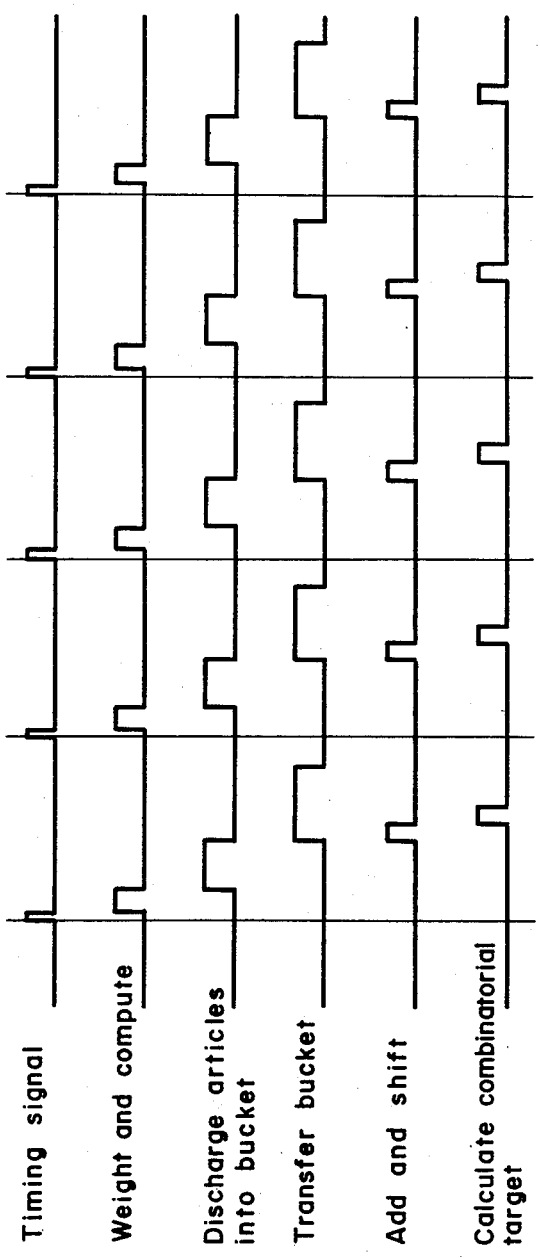
FIG. 7 is a timing chart illustrating the operating sequence of the various unit constituting the system of the invention.

The operating sequence of the foregoing units following completion of the first packaging operation is as shown in the timing chart of FIG. 7. In the illustrated embodiment, $n_1 = n_2 = n_3 = n_4$.

When the improper quantity signal E is produced by the weighing unit 2, combinatorial counting units 4a through 4f or combinatorial weighing unit 5 after a weighing or combinatorial computation has been performed, the unit which has produced the signal E is provided with additional candy or made to perform a computation again, as described hereinabove. When any of these units produces the signal E, namely when even one of the units gives an indication of an improper quantity during operation, the control unit 22 does not produce the discharge enable signal C. Therefore, none of the units discharge candy into the awaiting buckets 12, and the bucket conveyor 10 remains at rest.

FIGS. 8 and 9 are views illustrating a specific arrangement of the foregoing units used when packaging a prescribed quantity of a wide variety of candy in a single pack according to the method described hereinabove. A plurality of the article supply units 1 are disposed at one end of the bucket conveyor 10, along one side of which the combinatorial counting units 4a through 4f are arranged. The combinatorial weighing unit 5 also is arranged on one side of the bucket conveyor 10 downstream of the combinatorial counting units. Disposed at the other end of the bucket conveyor 10 is the packaging unit 11.

The construction of the article supply units 1 will now be described in detail in conjunction with FIGS. 10 through 12.

Figure 10:
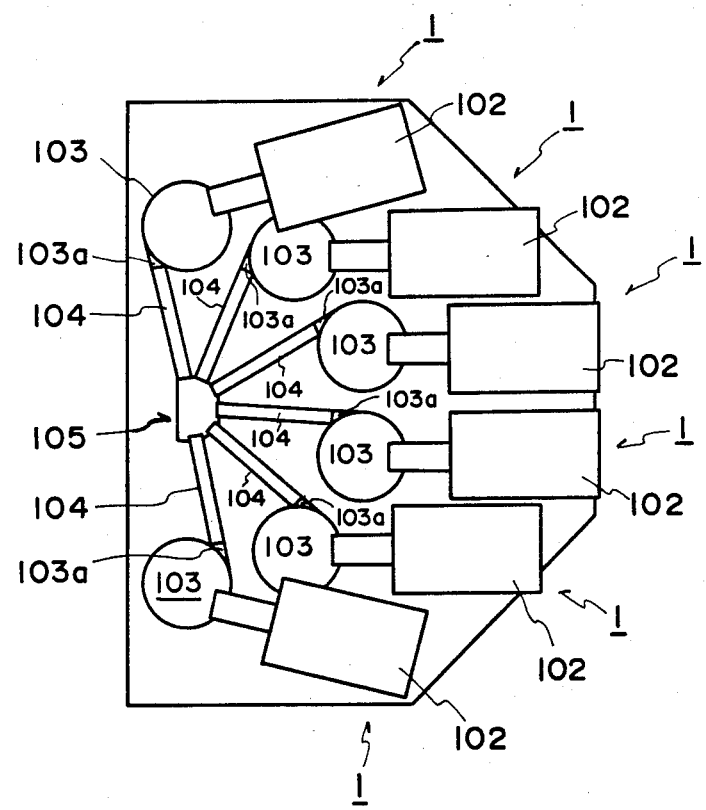
FIG. 10 is a schematic plan view of article supply units constituting the system of the invention.

As shown in FIG. 10, the article supply units 1 are of identical construction, each comprising a charge hopper 102 containing a large supply of articles and operable to supply these articles at random through the action of a vibrator (not shown) disposed therebelow, a feeder 103 for receiving the articles discharged from the hopper 102 and for continuously feeding the articles in a single row by means of vibration, and a chute 104 along which the articles delivered by the feeder 103 slide downwardly to a predetermined position via an article delivery section 103a, whereby a predetermined number of the articles are discharged one at a time. A plurality (six in the illustrated embodiment) of these articles supply units 1 are disposed at the periphery of a weighing unit 105. This arrangement makes it possible to designate the number of articles in a mixture having a maximum of six different article varieties.

Figure 12:
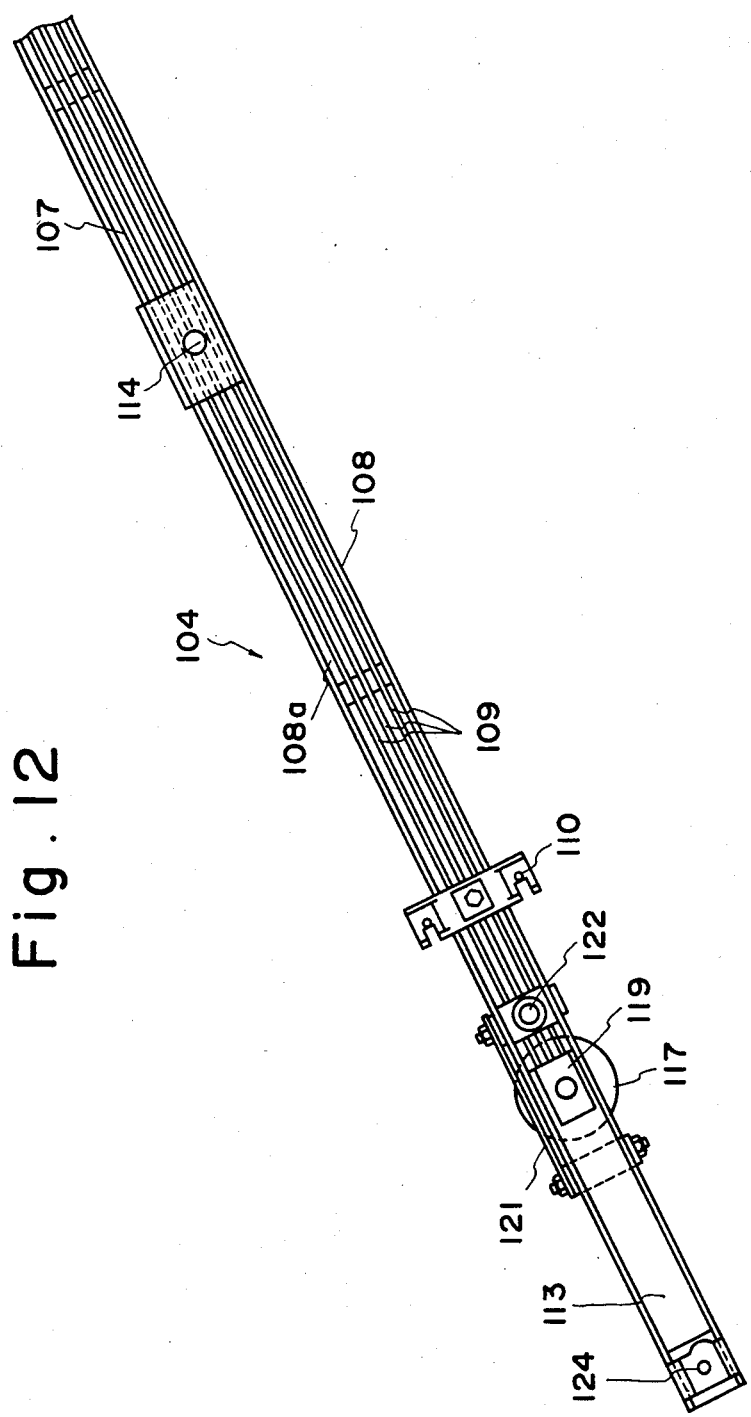
FIG. 12 is a plan view of a chute constituting the article supply unit.

As shown in FIGS. 11 and 12, the chute 104 of each article supply unit 1 includes a main body 108 consisting of a transparent acrylic plate formed into a U-shaped cross section for defining a channel 107 the width of which is just large enough to permit the passage of a row of articles 106 therealong, and a plurality of rails 109 extending longitudinally of the main body 108 and attached to the floor 108a by mouning elements 110. The articles 106 slide on these rails 109. The chute 104 is connected to the article delivery section 103a of the feeder 103 and is attached to a stand 111 through a supporting frame 112, so as to slant downwardly from the connected end thereof. A stopper 113 is affixed to the other end of the chute 104 and stops the articles 106 which arrive from above, whereby the articles temporarily accumulate within the chute. A sensor 114 is provided at a point approximately midway along the chute 104 to detect the accumulation of the articles 106. The sensor 114 halts the vibration of the feeder 103 upon detecting that a certain number of the articles have accumulated within the chute 104, and causes the feeder 103 to vibrate and, hence, supply articles to the chute, upon detecting a decrease in the amount of accumulated articles as the articles are subsequently discharged. Thus, the accumulation of articles 106 within the chute 104 is held constant. In other words, the row of articles in the chute will always have a certain length.

Numeral 115 denotes a lifting mechanism provided at the lower end of the chute 104 ahead of the stopper 113. The lifting mechanism 115 includes a lifting cylinder 117 attached to a bracket 116 secured to the bottom of the chute 104, the cylinder having a piston rod 117a, and a lifting member 119 to which one end of the piston rod 117a is connected upon being inserted into the interior of the chute 104 through an aperture 118 formed in the floor 108a of the chute. In operation, the upper surface of the lifting member 119 is substantially flush with the slide surface of the rail members 109 when the piston rod 117a of the cylinder 117 is in the retracted state. Extending the piston rod 117a raises the lifting member 119, which in turn raises the leading article 106 by the height of the stopper 113. As a result, the article slides downwardly along the upper surface of the stopper 113 and is discharged from the chute 104.

A restraining mechanism 120 is provided upstream of the lifting mechanism 115 at a distance equivalent to one article 106. The restraining mechanism 120 comprises a restraining cylinder 122 supported above the chute 104 by a bracket 121 secured to the side wall of the chute, the cylinder 122 having a piston rod 122a, and a restraining member 123 attached to one end of the piston rod 122a and having a cushioning function provided by a coil spring. In operation, retracting the piston rod 122a of the restraining cylinder 122 raises the restraining member 123 to form a clearance between the restraining member and the upper surface of the rails 109, the clearance being large enough to permit the passage of an article 106 therethrough. When the piston rod 122a is extended, the restraining member 123 is lowered to resiliently restrain the second article 106 in the row, counting from the lower end of the chute. This prevents the second and following articles 106 from moving. The lifting cylinder 117 of the lifting mechanism 115 and the restraining cylinder of the restraining mechanism 120 are extended in sequential fashion. Specifically, first the restraining cylinder 122 is extended to prevent the movement of the second and following articles, then the lifting cylinder 117 is extended to discharge the first, or leading, article 106. The lifting cylinder 117 is then immediately retracted, followed by retraction of the restraining cylinder 22, which permits the next article 106 in the row to abut against the stopper 113. Thus the row of articles is allowed to move downwardly along the chute 104 by a distance equivalent to one article.

A discharge sensor 124 provided at the lower or terminal end of the chute 104 detects and counts the articles 106 which slide along the upper surface of the stopper 113 just before they are discharged.

The weighing unit 105 is provided with a pool hopper 125 and a weighing hopper 126, as shown in FIG. 11. The pool hopper 125 is disposed below the terminal end of each of the chutes 104, and the weighing hopper 126 is disposed below the pool hopper 125. The weighing hopper 126 is provided with a weight detecting mechanism (not shown) for measuring the weight of the article mixture supplied to the weighing hopper. It should be noted that even though the mixture of articles is being weighed by the weighing hopper 126, the pool hopper 125 is capable of receiving articles 106, which are to be weighed in the next batch, from each of the article supply units 1. When the pool hopper 125 receives these articles and the weighing hopper 126 completes the discharge of the articles that it has weighed, a hopper gate (not shown) provided on the pool hopper 125 is opened to introduce the next batch of articles 106 into the weighing hopper 126.

The charge hopper 102 and feeder 103 are each provided with a level detector (not shown). When the level of the articles 106 in the feeder 103 drops below a certain value, the corresponding level detector actuates the vibrator of the charge hopper 102 in such a manner that the charge hopper 102 will supply the feeder 103 with a suitable amount of the articles. If the level of the articles in the charge hopper 102 drops too low, then the corresponding level detector lights a warning lamp (not shown).

The overall operation of the article supply units 1 will now be described. The plurality of charge hoppers 102 are each supplied in advance with articles 106, the articles differing from one charge hopper to the next. By controlling the vibrating time of the charge hoppers 102, each corresponding feeder 103 is supplied with a suitable amount of the articles. The feeder 103 is then vibrated to align and feed the articles 106 continuously to the corresponding chute 104. When this is accomplished, the articles 106 slide downwardly along the chute 104 under their own weight in successive fashion and stop when the leading article abuts against the stopper 113. As a result, the articles accumulate within the chute 104. When this is detected by the sensor 114, the vibration of the feeder 103 is terminated to halt the delivery of the articles 106. Thereafter, the piston rod 117a of the lifting cylinder 17 in the lifting mechanism 115 and the piston rod 122a of the restraining cylinder 122 in the restraining mechanism 120 are sequentially extended. Accordingly, first the restraining member 123 is lowered to halt the movement of the articles 106 from the second article onward by resiliently restraining the second article, counting from the article at the lower end of the chute 104. Next, the lifting member 119 is raised to lift the first article 106 clear of the stopper 113, whereby this article drops into the pool hopper 125 of the weighing unit 105. This article is detected and counted by the discharge sensor 124, whereupon the piston rod 117a of the lifting cylinder 117 and the piston rod 122a of the restraining cylinder 122 are sequentially retracted, allowing the second article 106 to move and abut against the stopper 113. If the designated quantity of articles 106 to be supplied by the article supply unit 1 is one, then the next weighing cycle begins. If the quantity designated is two, then the foregoing operations of the lifting mechanism 115 and restraining mechanism 120 are repeated to discharge another article 106 into the pool hopper 125 from the lowermost end of the chute 104. The operation proceeds in a similar manner if three or more articles are designated.

When the designated numbers of articles from respective article supply units 1 are introduced into the pool hopper 125, the latter discharges this batch of articles into the weighing hopper 126, where the batch is weighed. The weight value obtained is applied to the control unit. At the completion of this weighing operation, the batch of articles is discharged from the weighing hopper 126 into a bucket of the bucket conveyor, which is then carried to succeeding stations to be supplied with different kinds of articles discharged from the combinatorial counting units and combinatorial weighing unit. The mixture obtained is then delivered for packaging.

The various mechanisms constituting the article supply units 1 and weighing unit 105 are controlled by a microcomputer constituting the control unit, which also controls the combinatorial weighing unit.

The foregoing operations are repeated in sequential fashion to supply the weighing hopper 126 with designated numbers of the articles via the pool hopper 125, the weighing hopper 126 weighing each batch received. When the amount of articles left in the chute 104 becomes small as they are being discharged into the pool hopper 125, this is detected by the sensor 114 which, in response, produces a signal to vibrate the feeder 103 and, hence, supply the chute 104 with articles 106. Thus, the amount of articles residing in the chute 104 is held constant. When the articles in the feeder 103 become too small in quantity, the feeder 103 is supplied by the charge hopper 102 with a suitable amount of the articles. When the amount of articles in the charge hopper 102 becomes too small, the operator is informed of the fact by a warning lamp or the like.

In accordance with the arrangement described above, each of the charge hoppers 102 of respective article supply units 1 is supplied beforehand with articles which differ in kind from one charge hopper to the next. A designated number of the articles of each kind can be supplied automatically to the weighing unit 105. Moreover, in each article supply unit 1, the articles retained in the chute 104 can be discharged from the chute one at a time by the lifting mechanism 115 and restraining mechanism 120, with each article so discharged being detected by the discharge sensor 124. This makes it possible to accurately supply any desired number of the articles to the weighing unit 105. Accordingly, in a mixing and weighing operation of the type in which the number of articles to be included in the mixture takes precedence, the articles which have priority in terms of their number can be supplied efficiently and the weighing operation can be performed at high speed.

Figure 13:
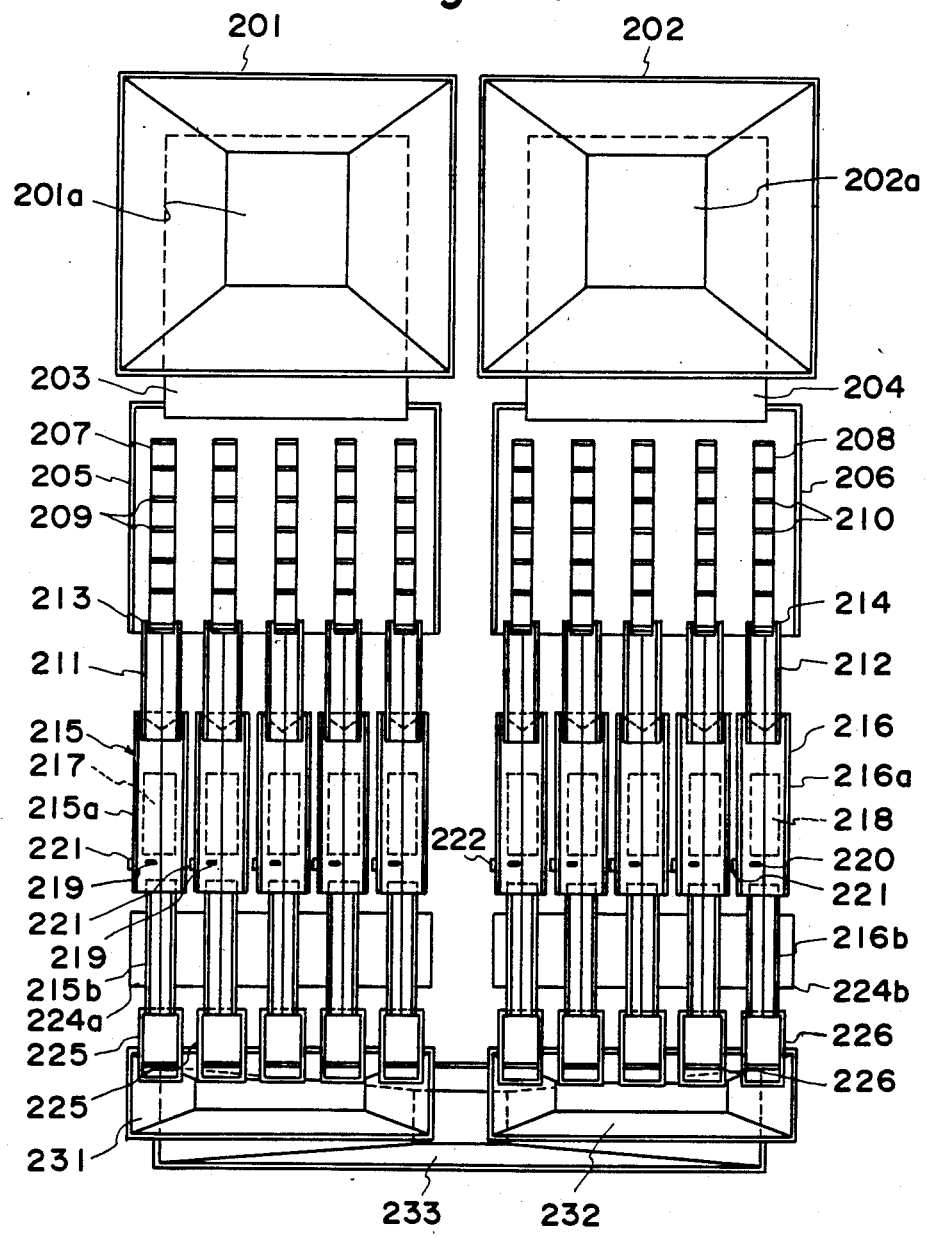
FIG. 13 is a plan view of the overall construction of a pair of combinatorial counting units.
Figure 14:
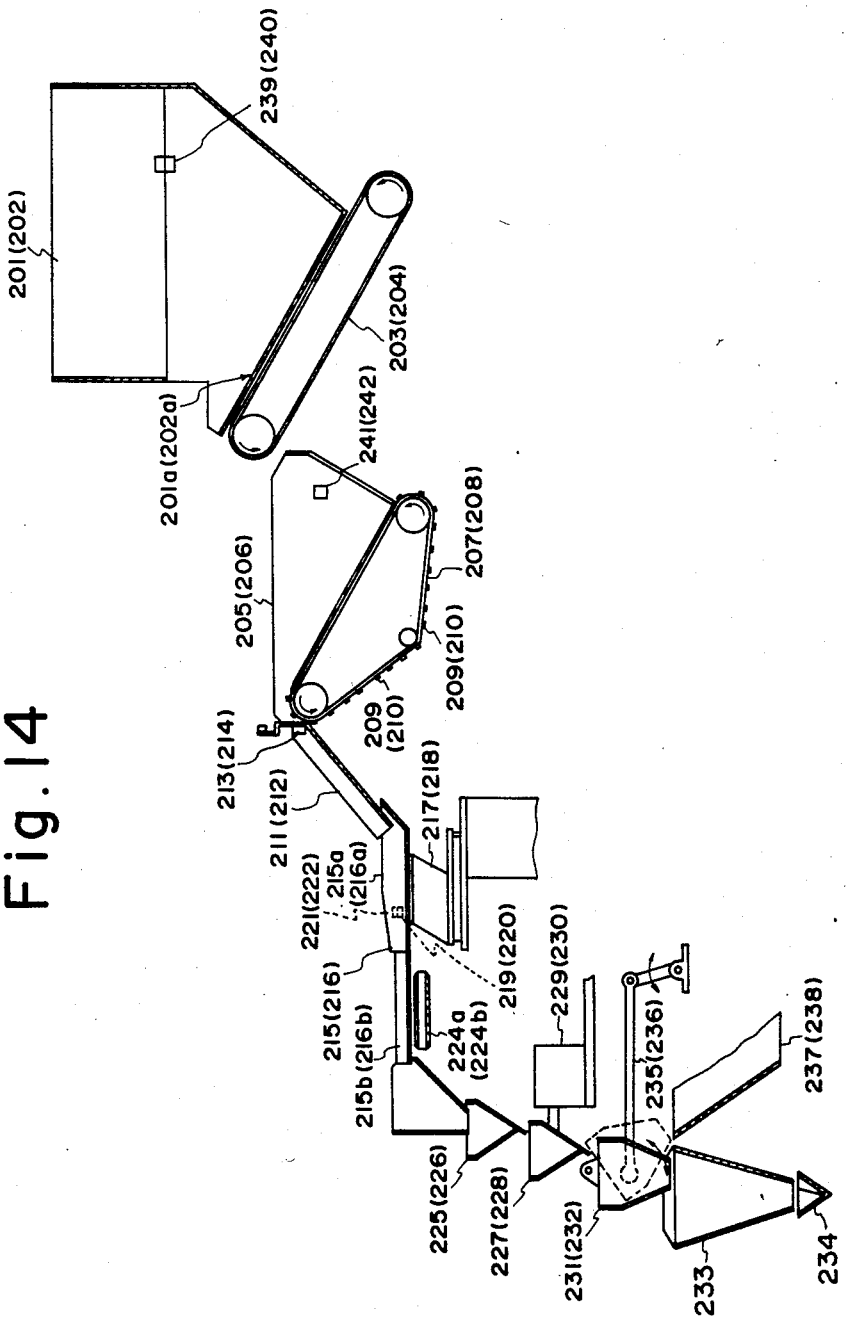
FIG. 14 is a sectional side view of the principal portion of a mechanism for distributively supplying and weighing articles.

Reference will now be had to FIGS. 13 and 14 to describe in detail the construction of the combinatorial counting units 4a through 4f. FIG. 13 is a plan view showing two of the weighing units disposed in side-by-side relation to form one set. FIG. 14 is a sectional side view illustrating the principal portion of a mechanism for distributively supplying and weighing articles.

In FIGS. 13 and 14, numeral 201 (202) denotes a supply hopper containing a large amount of articles, the bottom of the hopper being provided with a belt conveyor 203 (204) for feeding the articles. Numeral 205 (206) denotes a charge hopper provided below an article supply section 201a (202a) of the supply hopper 201 (202). The charge hopper 205 (206) substantially has the shape of an inverted triangle when seen in cross-section, the top and front sides of the charge hopper being open. Numeral 207 (208) designates an article aligning conveyor which circulates along the bottom of the charge hopper 205 (206) toward the front opening thereof. A plurality, e.g., five, of the aligning conveyors 207 (208) are disposed in side-by-side relation within the charge hopper 205 (206). Each of the aligning conveyors 207 (208) is a belt conveyor wide enough to carry the articles, the conveying side of each conveyor 207 (208) being provided with a multiplicity of projections 209 (210), which are spaced apart by a prescribed distance. The conveyors 207 (208) are disposed at an incline which rises toward the front side of the charge hopper 205 (206), and each conveys the articles one at a time in a single, continuous row within the charge hoppers.

Chutes 211 (212) having a V-shaped cross-section are disposed in front of the aligning conveyors 207 (208). Articles delivered by the aligning conveyors 207 (208) slide downwardly along the respective chutes 211 (212) under their own weight and arrive at a predetermined position. A detector 213 (214), such as a photosensor comprising a light-emitting and light-receiving element, is provided at the front end of each aligning conveyor 207 (208) for detecting each passage of an article as it falls from the corresponding aligning conveyor into the corresponding chute. Each time an article is so detected, the corresponding aligning conveyor 207 (208) is stopped. Thus, circulation of the aligning conveyor is halted whenever a single article is conveyed into the corresponding chute by the conveyor.

A trough 215 (216) is provided below the forward end of each chute 211 (212), and is secured to the upper side of a corresponding vibrator 217 (218). The troughs 215 (216) temporarily retain the articles received from the respective chutes 211 (212), and each feeds a suitable number of these articles in a row by being vibrated. Each of the troughs 215 (216) comprises a retaining portion 215a (216a) having an inverted trapezoidal cross-section for retaining the articles, and a channel portion 215b (216b) for feeding the articles one at a time. The forward side wall of each retaining portion 215a (216a) is formed to include a slit 219 (220) which allows the transfer of the articles to be detected from the outside.

Detectors 221 (222), such as photosensors, are provided so as to confront respective ones of the slits 219 (220) formed in the side wall of the troughs 215 (216). Each detector 221 (222) detects whether an article has been transported within the corresponding trough 215 (216) past the slit 219 (220). If transport of an article is not detected, indicating that the articles in the trough 215 (216) are static, then the corresponding aligning conveyor 207 (208) remains at rest. Each time an article is detected to pass by the slit, the corresponding aligning conveyor 207 (208) is driven so that an article is supplied from the charge hopper 205 (206). Thus, the articles are supplied by the charge hoppers one at a time. A conveyor 224a (224b) for recovering articles which have overflown is provided below the channel portions 215b (216b) of the respective troughs 215 (216). Though the channel portions 215b (216b) overlying the recovery conveyor 224a (224b) each have a V-shaped cross-section, one side wall of the channel is designed to be extremely small in height, so that articles passing through the channel portion 215b (216b) will fall from the channel if they overlap other articles. This arrangement is to assure that only a single layer of aligned articles will travel along the trough 215 (216). These overflow articles which have fallen from the channel portions 215b (216b) are recovered by the conveyor 224a (224b). A pool hopper 225 (226) is disposed below the leading end of each trough 215 (216), and a weighing hopper 227 (228) is disposed below each pool hopper 225 (226). Each weighing hopper 227 (228) has a weight sensor 229 (230) for measuring the weight of a batch of articles supplied to the weighing hopper, and for applying the resulting weight value to a control unit (e.g., control unit 22 in FIG. 2). A weighing machine is constructed by each weighing hopper 227 (228) and the weight sensor 229 (230) associated therewith, and a drive unit (not shown) is provided for opening the gates (not shown) of the pool and weighing hoppers. The control unit which has received the weight values from the group of weighing hoppers 227, obtains the number of articles in each weighing hopper 227 by dividing each weight value by the unit weight of the articles. The control unit computes combinations based on the numbers obtained, selects an optimum combination giving a number of articles equal to a set number or closest to the set number within preset allowable limits, and causes the articles to be discharged from the weighing hoppers 227 corresponding to the selected combination. The control unit, which has received the weight values from the other group of weighing hoppers 228, likewise obtains the number of articles in each weighing hopper 228 by dividing each weight value by the unit weight of the articles, computes combinations based on the numbers obtained, selects an optimum combination giving a number of articles equal to a set number or closest to the set number within preset allowable limits, and causes the articles to be discharged from the weighing hoppers 228 corresponding to the selected combination.

Numeral 231 denotes a director chute disposed below the entire row of five weighing hoppers 227, and numeral 232 denotes a director chute disposed below the entire row of five weighing hoppers 228. A single collecting chute 233 is disposed below both of the director chutes 231, 232 for collecting and discharging into a collecting hopper 234 the articles gathered by both of the director chutes 231, 232. The two director chutes 231, 232 are pivoted at the upper portion thereof by means of a pin and are capable of being rotated in the directions of the arrows by respective connecting rods 235, 236. Under ordinary conditions, the director chute 231 (232) is in the attitude indicated by the solid lines so that articles received from the weighing hoppers 227 (228) will flow into the collecting chute 233. However, in the event that articles in excess of a target number have been supplied to the weighing hoppers 227 (228), or if an optimum combination cannot be found among the weighing hoppers 227 (228), then, in response to a command from the control unit, the connecting rod 235 (236) is pulled in the direction of the arrow to tilt the director chute 231 (232) into the attitude indicated by the dashed lines, whereby the articles from the improperly supplied weighing hoppers are discharged into a recovery chute 237 (238).

It should be noted that the aligning conveyors 207 (208) are operable independently of each other, as are the troughs 215 (216). The supply hopper 201 (202) is provided with a photosensor 239 (240) for detecting the level of the articles within the hopper through suitable slits formed in the side walls of the hopper. Similarly, the charge hopper 205 (206) is provided with a photosensor 241 (242) for detecting the level of the articles within the hopper through slits formed in the side walls thereof.

In operation, a large quantity of articles a of one kind, and a large quantity of articles b of a different kind, are introduced into the supply hoppers 201, 202, respectively. Though the articles contained in the supply hopper 201 (202) gradually diminish as the counting operation progresses, the photosensor 239 (240) disposed at the side of the supply hopper will detect when the level of the articles becomes too low and will issue a signal to light a warning lamp (not shown).

The belt conveyor 203 (204) disposed at the bottom of the supply hopper 201 (202) is adjustable in terms of its angle of inclination, and a gate (not shown), which is disposed within the supply hopper 201 (202) and which is of the same width, is adjustable in position and angle. Adjusting the belt conveyor 203 (204) and the gate regulates the size of the opening between the gate and the upper surface of the belt conveyor 203 (204) so that the articles a (b) transported by the belt conveyor 203 (204) will form a substantially uniform layer on the belt. The belt conveyor 203 (204) is driven in a manner described below, whereby the minimum necessary amount of the articles a (b) is supplied to the charge hopper 205 (206).

The photosensor 241 (242) disposed at the side wall of the charge hopper 205 (206) monitors solely the minimum level of the articles a (b) within the charge hopper 205 (206), and is adapted to drive the belt conveyor 203 (204) only when the supply of articles a (b) drops below the minimum level as the counting operation progresses. The belt conveyor is turned off upon expiration of a time limit set in a counter (not shown), the operation of which starts at the instant the belt conveyor is actuated. This is to prevent an excess of the articles from being delivered to the charge hopper 205 (206). The articles are conveyed to the next step of the process by the five aligning conveyors 207 (208) at the bottom of the charge hopper 205 (206). As mentioned above, the amount of articles fed into the charge hopper is limited, because the aligning conveyors 207 (208) are arranged at an incline, because each conveyor has a belt width capable of carrying only a single article, and because each is provided with the spaced projections 209 (210). Due to such an arrangement, the articles a (b) can be conveyed one at a time in single rows by the independent operation of the aligning conveyors 207 (208). The moment at which each of the aligning conveyors 207 (208) starts to be driven is controlled by a signal from a succeeding step of the process, as will be described below. Each aligning conveyor 207 (208) is stopped whenever discharge of a single article is confirmed by the photosensor 213 (214) disposed at the leading end of the conveyor.

Each single article a (b) discharged slides downwardly along the chute 211 (212) and arrives at the retaining portion 215a (216a) of the respective trough 215 (216). Despite the method of article conveyance described above, there are cases where a plurality of the articles arrive in poor order. The retaining portion 215a (216a) serves to pool the articles and place them in better order through vibration so that the articles will not be sent to the next step of the process in a poorly arranged state.

Only the troughs 215 (216) corresponding to the weighing hoppers 227 (228) previously selected by the combinatorial counting operation are individually vibrated for a prescribed period of time by the underlying vibrators 217 (218) to individually transport the articles therealong. The movement of the articles along the troughs is confirmed by the photosensors 221 (222) disposed alongside. Each photosensor generates a signal whenever transfer of an article in the associated trough is confirmed. With each generation of the signal, the aligning conveyor 207 (208) corresponding to the trough is driven.

Any articles which are stacked on other articles as the articles are transferred along the troughs 215 (216), fall from cut-outs in the side walls of the trough channel portions 215b (216b) and are recovered by the underlying conveyor 224a (224b), which is rotating at all times. Each cut-out may have the configuration of a gate the opening degree whereof can be made adjustable.

The articles a (b) in each trough 215 (216) are thus arranged in a single row and sequentially fed into the corresponding pool hopper 225 (226) while the trough is being vibrated. The pool hopper gate (not shown) is opened by a drive unit (not shown) to discharge the articles into the underlying weighing hopper 227 (228). When a weighing operation is being performed, the corresponding pool hopper is supplied with and retains a batch of articles for the next weighing cycle. When the corresponding weighing hopper is emptied, therefore, the pool hopper gate may be opened immediately to resupply the weighing hopper, thereby reducing the time for the overall weighing operation.

Like the pool hoppers 225 (226), the weighing hoppers 227 (228) have weighing hopper gates (not shown) which are opened by the aforementioned drive unit to discharge the articles from the weighing hoppers.

While the articles a (b) are being supplied to the pool hoppers 225 (226), the weights of the article batches contained in the weighing hoppers 227 (228) are measured by the corresponding weight sensors 229 (230), which apply the measured weight values to the control unit. The control unit associated with the weighing hoppers 227 performs prescribed computations, selects an optimum combination giving a number of articles (a) equal to a set number or closest to the set number within preset allowable limits, and causes the articles (a) to be discharged from the weighing hoppers corresponding to the selected combination. The control unit associated with the weighing hoppers 228 likewise performs prescribed computations, selects an optimum combination giving a number of articles (b) equal to a set number or closest to the set number within preset allowable limits, and causes the articles (b) to be discharged from the weighing hoppers corresponding to the selected combination. At discharge, the total weights of the articles a, b discharged are stored in memory. The articles a, b discharged from the selected weighing hoppers 227, 228 are collected and, hence, mixed in the collecting hopper 234 upon passing through the respective director chutes 231, 232 and collecting chute 233.

In order to mix a wide variety of articles in which the number of articles of each kind is designated, and in order to supplement these articles with articles of another kind to obtain a mixture having a set weight, the necessary number of the foregoing combinatorial counting units are provided, as well as the bucket conveyor which interconnects the combinatorial weighing unit 5 with each of the counting units 4a through 4f. Then, by way of example, the mixture of articles a, b from the collecting chute 234 is discharged into a bucket 12 of the bucket conveyor 10, the bucket 12 is advanced to the next station, articles c, d (counted out at this station by a pair of the combinatorial weighing units) are discharged into the same bucket, and so on. The total weight of the mixture composed of articles a, b, c, d, ... is subtracted from the overall weight set for the mixture, and the resulting value is used as a target weight for a combinatorial weighing operation performed by the combinatorial weighing unit 5. The latter, based on this target value, combinatorially weighs a different variety of supplemental articles, selects an optimum combination of the articles, the total weight of which is equivalent to the target weight value, discharges these articles from the corresponding weighing machines, and supplies the articles to the aforementioned bucket. The mixture of articles so obtained has the designated number of articles of each kind as well as an overall weight equivalent to the set weight.

When a weighing hopper 227 (228) selected by the combinatorial counting unit is emptied by discharging its articles a (b), the weighing hopper is resupplied by the corresponding pool hopper 225 (226), weighing and counting are carried out again, and the target number of articles a (b) is discharged into the collecting hopper 234. At the same time, the troughs 215 (216) and aligning conveyors 207 (208) corresponding to the emptied pool hoppers 225 (226), are operated to supply these pool hoppers 225 (226) with a suitable number of the articles a, b to prepare for the next weighing cycle. When the articles a (b) contained in the charge hopper 205 (206) diminish in quantity, a signal from the photosensor 241 (242) causes the supply hopper 201 (202) to supply the charge hopper 205 (206) with additional articles a (b).

The foregoing series of operations is repeated in sequential fashion to continuously discharge the articles a (b) in an amount equivalent to the target number.

Even though the supply of articles is controlled in the above-described manner so as to avoid excess delivery, there are instances where too many articles accumulate in the weighing hoppers. When this occurs, or when an optimum combination cannot be found, this fact is detected from the weight data which arrives from the weight sensors 229 (230), and the control unit issues a command. In response, the director chute 231 (232) is tilted to discharge the excess of articles from the weighing hoppers into the recovery chute 237 (238), leaving the weighing hoppers empty. These are then resupplied.

The control unit 22 (FIG. 2), which incorporates a microcomputer, controls such equipment as the series of combinatorial counting units 4a through 4f, the combinatorial weighing unit 5 and the bucket conveyor 10.

With the combinatorial counting units 4a through 4f of the foregoing arrangement, the two varieties of articles a, b are introduced into the two supply hoppers 201, 202, respectively. This makes it possible to supply the articles, discharge designated numbers of each variety into the collecting hopper 234 and, hence, mix the articles, all in automatic fashion.

A restriction is placed upon the flow of articles in the article transfer and supply line extending from the supply hoppers to the pool hoppers. Specifically, the transfer from the supply hoppers 201 (202) to the charge hoppers 205 (206) is controlled by the belt conveyor 203 (204) and gate (not shown) so that the quantity of articles on the belt will form a single layer. The amount of articles in the charge hopper 205 (206) is kept at the minimum necessary by monitoring the article level using the photosensor 241 (242).

The articles a (b) in the charge hopper 205 (206) are divided into five rows by the five juxtaposed aligning conveyors 207 (208). Each time a single article a (b) is discharged into the chute 211 (212), as confirmed by the photosensor 213 (214) at the leading end portion of the corresponding aligning conveyor 207 (208), the aligning conveyor is halted independently of the other aligning conveyors and is not actuated again until a signal arrives from a later stage of the process. This places a further restriction upon the amount of article flow. Among the troughs 215, 216 that have received the articles from the chutes 211 (212), only those corresponding to the weighing hoppers selected in the optimum combination are vibrated for a prescribed length of time. The transfer of articles along these troughs is verified by the corresponding photosensors 221 (222). As soon as such transfer is verified, the photosensor sends a command, which calls for supply of the next article, to the corresponding aligning conveyor 207 (208). Thus, control is exercised to provide a predetermined flow in which one article is supplied when one article is discharged.

At this stage of the process, articles which are stacked upon others are caused to overflow from the channel portions 215b (216b) of the troughs, so that only articles aligned and in good order are delivered to the pool hoppers 225 (226). This prevents an excess of the articles from being supplied.

In the event that the weighing hoppers 227 (228) are supplied with an excess of articles in spite of the foregoing control operations, the director chute 231 (232) is tilted to direct the excess of articles from the weighing hoppers into the recovery chute 237 (238), which diverts the articles to a separate path.

Owing to the foregoing arrangement, counting can be performed very efficiently. In addition, an improvement in weighing efficiency is possible, as well as automation of the process, by using the combinatorial counting unit in a mixing and weighing activity in which precedence is given to the numbers of each of the types of articles in the mixture, while the overall weight of the mixture is made to have a set weight. Further, since the components of the combinatorial counting unit are arranged linearly and in juxtaposed fashion, the overall unit is reduced in size, so that a plurality of the units can themselves be juxtaposed or disposed to confront each other. Thus, less space is required for installation.

It should be noted that the supply of articles to the pool hoppers 225 (226) can be controlled as desired by suitably adjusting the vibration time set for the troughs 215 (216).

In the foregoing description, two of the combinatorial counting units are arranged in a set and are supplied with two kinds of articles. However, the invention is not limited to such a configuration. A plurality of the counting units may be combined into one set, or a number of individual counting units may be provided. Alternatively, by juxtaposing a multiplicity of the counting mechanisms, a wide variety of articles can be supplied.

Ordinarily, each of the combinatorial counting units 4a through 4f processes from three to five pieces of candy for inclusion in a single pack. In a case where the number of pieces of candy to be included in a twist pack or the like is designated as one or two, it is extremely difficult for the article feed units to discharge the candy in a row one piece at a time. Accordingly, there are instances where this operation is performed by a combinatorial counting unit. In such case, since the designated number is one or two, the combinatorial computing function is not required. Instead, the combinatorial counting unit operates as a simple weighing unit in which the weight of the candy contained in a weighing machine is merely divided by the unit weight.

In the arrangement described hereinabove, the candies discharged from each of the foregoing units are collected and conveyed to the packaging unit by driving the bucket conveyor 10 to transport the buckets from right to left in FIGS. 8 and 9, during which time the candies are sequentially collected from the various units for final discharge into the packaging unit.

In accordance with the present invention as described and illustrated hereinabove, a wide variety of candies are included in a single pack at a designated number and ratio which are predetermined. This is carried out by discharging prescribed numbers of the candies, which are high in unit price or large in volume, by using the article supply units and combinatorial counting units, storing the weight of the candies discharged, subtracting this weight from the weight set for the pack, computing how much weight must be added to arrive at the set weight, and subsequently discharging inexpensive articles using the combinatorial weighing unit, the weight of the articles discharged being equivalent to the computed weight. Thus, a prescribed number of candies can be introduced into a single pack at a fixed ratio and, at the same time, the total weight of the pack can be held within established limits.

In the illustrated embodiment, a wide variety of candy is included in a single pack. However, the invention can be applied to other articles where a wide variety of articles are to be included in a single pack at a fixed ratio.

As many apparently widely different embodiments of the present invention can be made without departing from the spirit and scope thereof, it is to be understood that the invention is not limited to the specific embodiments thereof except as defined in the appended claims.

What we claim is:

1. A mixing combinatorial counting and weighing apparatus for providing categories of articles for packaging in a single pack, comprising:

a plurality of article supply units each for discharging a predetermined number of articles at a time;

a weighing unit positioned to collect the articles discharged by each of said article supply units, for weighing the articles and for discharging the articles along first or second discharge routes;

means for discharging the articles in said weighing unit along the first discharge route if the weight value of the articles falls within a first preset allowable range of a first set batch weight value, for discharging the articles in said weighing unit along the second discharge route if the weight value of the articles is greater than the upper limit of the first preset allowable range of the first set batch weight value, and for supplying articles to any of said article supply units from which a number of articles less than the predetermined number of articles is discharged if the weight value of the articles is less than the lower limit of the first preset allowable range of the first set batch weight value;

a plurality of combinatorial counting units, each for executing a combinatorial counting operation to obtain a best combination of articles having a total number of articles which is equal or closest to a preset number of articles;

means for discharging the articles in the combinatorial counting units along a third discharge route if the best combination of the articles in each of the combinatorial counting units falls within a second preset allowable range and for discharging the articles in the combinatorial counting units along a fourth discharge route if the best combination of articles in each of the combinatorial counting units does not fall within the second preset allowable range;

means for adding the weights of the articles discharged along the first and third discharge routes by said weighing unit and said combinatorial counting units, respectively, and for storing the sum of the weights;

means, operatively connected to said adding means, for computing a weight difference by subtracting the sum of the weights from a predetermined weight set for the single pack; and a combinatorial weighing unit, operatively connected to said computing means, for performing combinatorial weighing with the weight difference serving as a target value and for discharging additional articles based on the results of the combinatorial weighing, the articles discharged by said weighing unit, said plurality of combinatorial counting units and said combinatorial weighing unit being provided for packaging in the single pack.

2. The apparatus according to claim 1, further comprising a bucket conveyor positioned to collect the articles discharged from said weighing unit, said combinatorial counting units, and said combinatorial weighing unit.

3. A combinatorial measuring method for measuring out a batch of articles from a plurality of categories, comprising the steps of:

(a) measuring out a predetermined number of articles of a first category;

(b) weighing the predetermined number of articles of the first category;

(c) discharging the weighed articles of the first category along a first discharge route if the weight value of the articles falls within a first preset allowable range;

(d) discharging the weighed articles of the first category along a second discharge route if the weight value of the articles is greater than the upper limit of the first preset allowable range;

(e) supplying articles of the first category to measure out a predetermined number of articles of the first category again if the weight value of the articles is less than the lower limit of the first preset allowable range;

(f) measuring out a predetermined number of articles of a second category by weighing out the articles of the second category;

(g) discharging the measured articles of the second category along a third discharge route if the measured number of articles of the second category falls within a second preset allowable range;

(h) discharging the measured articles of the second category along a fourth discharge route if the measured number of articles of the secondary category does not fall within the second preset allowable range;

(i) adding the weights of the predetermined number of articles of the first category and the predetermined number of articles of the second category to obtain a summed weight;

(j) computing the difference between the summed weight and a predetermined weight for the batch of articles;

(k) performing combinatorial weighing on a third category of articles using the difference determined in said step (e) as a target value; and (l) combining the predetermined number of articles of the first category, the predetermined number of articles of the second category and the articles of the third category determined by said combinatorial weighing step (f) to form the batch of articles of plural categories.

4. The method according to claim 3, further comprising the step of storing the weights obtained in said steps (b) and (f) wherein said step (i) comprises adding the stored weights.

* * * * *